(12) United States Patent
Iwata

(10) Patent No.: US 11,888,757 B2
(45) Date of Patent: Jan. 30, 2024

(54) PERFORMING CALCULATION FOR STATE MANAGEMENT WHEN FAILURE IN COMMUNICATION HAS OCCURRED

(71) Applicant: NEC Corporation, Tokyo (JP)

(72) Inventor: Hajime Iwata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 95 days.

(21) Appl. No.: 17/438,557

(22) PCT Filed: Feb. 3, 2020

(86) PCT No.: PCT/JP2020/003849
§ 371 (c)(1),
(2) Date: Sep. 13, 2021

(87) PCT Pub. No.: WO2020/195162
PCT Pub. Date: Oct. 1, 2020

(65) Prior Publication Data
US 2022/0150180 A1    May 12, 2022

(30) Foreign Application Priority Data
Mar. 22, 2019  (JP) .................................. 2019-054307

(51) Int. Cl.
*H04L 47/74* (2022.01)
*H04L 45/00* (2022.01)
(Continued)

(52) U.S. Cl.
CPC ............ *H04L 47/746* (2013.01); *H04L 45/20* (2013.01); *H04L 45/28* (2013.01); *H04L 47/12* (2013.01)

(58) Field of Classification Search
CPC .................................................... H04L 47/746
See application file for complete search history.

(56) References Cited

U.S. PATENT DOCUMENTS

| 8,120,793 B2 * | 2/2012 | Lovat ................. H04N 1/00204 358/1.14 |
| 2008/0144488 A1 * | 6/2008 | Tuulos ................ H04L 41/0681 370/216 |

(Continued)

FOREIGN PATENT DOCUMENTS

| JP | H10-124103 A | 5/1998 |
| JP | 2001-144761 A | 5/2001 |

(Continued)

OTHER PUBLICATIONS

International Search Report for PCT Application No. PCT/JP2020/003849, dated Apr. 28, 2020.

*Primary Examiner* — Guang W Li

(57) ABSTRACT

A communication unit (2) communicates with a management apparatus directly or via another communication apparatus. A transfer control unit (4) performs processing of transferring a state change notification that has been transmitted from a first communication apparatus and indicates a state change of the first communication apparatus. A proxy calculation unit (6) performs, when a failure in communication has occurred at the side of the management apparatus, calculation for state management performed by the management apparatus using the state change notification. When a failure in communication has occurred, the transfer control unit (4) outputs a state change notification to the proxy calculation unit (6). When the failure in communication has been resolved, the transfer control unit (4) performs control so as to transmit the result of the calculation by the proxy calculation unit (6) to the management apparatus.

15 Claims, 11 Drawing Sheets

(51) Int. Cl.
*H04L 45/28* (2022.01)
*H04L 47/12* (2022.01)

(56) References Cited

U.S. PATENT DOCUMENTS

| | | | |
|---|---|---|---|
| 2014/0369180 A1* | 12/2014 | Shimokawa | H04L 49/40 370/255 |
| 2016/0066364 A1* | 3/2016 | Marinier | H04W 76/28 370/329 |
| 2016/0072904 A1* | 3/2016 | Asnis | H04L 63/0823 709/224 |
| 2017/0019481 A1* | 1/2017 | Takeda | H04L 12/40019 |
| 2017/0149650 A1* | 5/2017 | Tsaltskan | H04B 10/80 |
| 2022/0150180 A1* | 5/2022 | Iwata | H04L 45/28 |

FOREIGN PATENT DOCUMENTS

| | | |
|---|---|---|
| JP | 2013-206074 A | 10/2013 |
| WO | 2015/146641 A1 | 10/2015 |

\* cited by examiner

| NE NAME | MODULE NAME | STATE |
|---|---|---|
| NE#1 | CPU | NORMAL |
| NE#1 | INTERFACE 1 | Link Down |
| NE#1 | MEMORY | NORMAL |
| ... | | |
| NE#x | MEMORY | READ ERROR |

Fig. 7

PERFORMING CALCULATION FOR STATE MANAGEMENT WHEN FAILURE IN COMMUNICATION HAS OCCURRED

This application is a National Stage Entry of PCT/JP2020/003849 filed on Feb. 3, 2020, which claims priority from Japanese Patent Application 2019-054307 filed on Mar. 22, 2019, the contents of all of which are incorporated herein by reference, in their entirety.

TECHNICAL FIELD

The present disclosure relates to a communication apparatus, a communication system, a communication method, and a non-transitory computer readable medium storing a program.

BACKGROUND ART

In a communication system including a plurality of communication apparatuses, a management apparatus may be used in order to manage, for example, states of a plurality of communication apparatuses. With regard to this technique, Patent Literature 1 discloses a network management system that solves a problem that equipment dedicated to a management agent is necessary and a problem that the processing load of the management agent cannot be dynamically adjusted when the number of communication devices increases.

In Patent Literature 1, each representative agent (management agent) collects and accumulates management information of network nodes managed by the representative agent (management agent). However, regarding management information (performance information etc.) other than failure information, each representative agent performs collection and accumulation only on network nodes managed by the representative agent (management agent). On the other hand, regarding failure information (operation state information etc.), each representative agent performs collection and accumulation on all the network nodes of the network to be managed.

CITATION LIST

Patent Literature

[Patent Literature 1] Japanese Unexamined Patent Application Publication No. 2013-206074

SUMMARY OF INVENTION

Technical Problem

According to the technique disclosed in Patent Literature 1, when a failure in communication has occurred, the management agent is not able to manage management information other than the failure information, such as performance information. Further, as the management agent performs collection and accumulation of the failure information on all the network nodes of the network to be managed, the management agent is able to manage failure information. However, this may cause the load of the entire network to be increased. Therefore, in the technique disclosed in Patent Literature 1, it is possible that a management apparatus may not able to manage the communication apparatus while preventing an increase in the processing load when a failure in communication has occurred.

The aim of the present disclosure is to provide a communication apparatus, a communication system, a communication method, and a program capable of enabling a management apparatus to manage the communication apparatus while preventing an increase in the processing load when a failure in communication has occurred.

Solution to Problem

A communication apparatus according to the present disclosure includes: communication means for communicating with a management apparatus that manages states of a plurality of communication apparatuses in a network including the plurality of communication apparatuses directly or via another communication apparatus; transfer control means for performing control for performing processing of transferring a state change notification that has been transmitted from a first communication apparatus, which is another communication apparatus located on a side opposite to the management apparatus, and indicates a state change in the first communication apparatus; and proxy calculation means for performing calculation for the state management performed by the management apparatus using the state change notification when a failure in communication has occurred at the side of the management apparatus, in which, when the failure in communication has occurred, the transfer control means outputs the state change notification to the proxy calculation means, and when the failure in communication has been resolved, the transfer control means performs control so as to transmit the result of the calculation by the proxy calculation means to the management apparatus.

Further, a communication system according to the present disclosure includes: a plurality of communication apparatuses that form a network; and a management apparatus that is connected to at least one of the plurality of communication apparatuses and manages states of the plurality of communication apparatuses, in which the communication apparatus includes: communication means for communicating with the management apparatus directly or via another communication apparatus; transfer control means for performing control for processing of transferring a state change notification that has been transmitted from a first communication apparatus, which is another communication apparatus located on a side opposite to the management apparatus, and indicates a state change in the first communication apparatus; and proxy calculation means for performing calculation for the state management performed by the management apparatus using the state change notification when a failure in communication has occurred at the side of the management apparatus, when the failure in communication has occurred, the transfer control means outputs the state change notification to the proxy calculation means, and when the failure in communication has been resolved, the transfer control means performs control so as to transmit the result of the calculation by the proxy calculation means to the management apparatus.

Further, a communication method according to the present disclosure includes: communicating with a management apparatus that manages states of a plurality of communication apparatuses in a network including the plurality of communication apparatuses directly or via another communication apparatus; performing, when a failure in communication has occurred at the side of the management apparatus, calculation for the state management performed by the management apparatus using a state change notification that has been transmitted from a first communication apparatus, which is another communication apparatus located on a side opposite to the management apparatus, and indicates a state change in the first communication apparatus; and performing control to transmit the result of the calculation to the management apparatus when the failure in communication has been resolved.

Further, a program according to the present disclosure causes a computer to execute the following steps of: performing, when a failure in communication has occurred at the side of a management apparatus that manages states of a plurality of communication apparatuses in a network including the plurality of communication apparatuses, calculation for the state management performed by the management apparatus using a state change notification that has been transmitted from a first communication apparatus, which is another communication apparatus located on a side opposite to the management apparatus, and indicates a state change in the first communication apparatus; and performing control so as to transmit the result of the calculation to the management apparatus when the failure in communication has been resolved.

Advantageous Effects of Invention

According to the present disclosure, it is possible to provide a communication apparatus, a communication system, a communication method, and a program capable of enabling a management apparatus to manage the communication apparatus while preventing an increase in the processing load when a failure in communication has occurred.

BRIEF DESCRIPTION OF DRAWINGS

FIG. 7 is a diagram illustrating the content of a database according to the first example embodiment.

DESCRIPTION OF EMBODIMENTS

Outline of Example Embodiment of Present Disclosure

Figure 1:
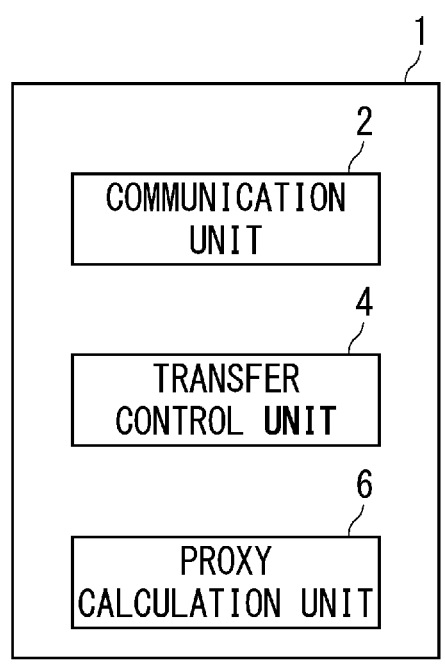
FIG. 1 is a diagram showing an outline of a communication apparatus according to an example embodiment of the present disclosure.

Prior to giving the description of an example embodiment of the present disclosure, an outline of the example embodiment of the present disclosure will be described. FIG. 1 is a diagram showing an outline of a communication apparatus 1 according to the example embodiment of the present disclosure. The communication apparatus 1 includes, for example, functions as a computer. The communication apparatus 1 is, for example, a Network Element (NE).

The communication apparatus 1 includes a communication unit 2, a transfer control unit 4, and a proxy calculation unit 6. The communication unit 2, the transfer control unit 4, and the proxy calculation unit 6 respectively function as communication means, transfer control means, and proxy calculation means. The communication unit 2 communicates with a management apparatus directly or via another communication apparatus. The management apparatus is, for example, a Network Management System (NMS) apparatus. The management apparatus manages states of a plurality of communication apparatuses in a network including the plurality of communication apparatuses.

The transfer control unit 4 performs processing of transferring a state change notification that has been transmitted from a first communication apparatus and indicates a state change of the first communication apparatus. The first communication apparatus is a communication apparatus that is different from the communication apparatus 1 and is installed on the side opposite to the management apparatus. The proxy calculation unit 6 performs, when a failure in communication has occurred at the side of the management apparatus, calculation for state management performed by the management apparatus using the state change notification. When a failure in communication has occurred, the transfer control unit 4 outputs the state change notification to the proxy calculation unit 6. Then when the failure in communication has been resolved, the transfer control unit 4 performs control so as to transmit the result of the calculation by the proxy calculation unit 6 to the management apparatus.

The communication apparatus 1 according to the present disclosure manages, when a failure has occurred, the state of the first communication apparatus that is installed on the side opposite to the management apparatus. Then, when the failure in communication has been resolved, the communication apparatus 1 transmits the result of the calculation for management of the state to the management apparatus. According to this configuration, the communication apparatus 1 enables the management apparatus to manage the communication apparatus while preventing the load (e.g., traffic volume) from increasing. That is, when a communication interruption between the NMS apparatus (management apparatus) and the NE (communication apparatus) has occurred, an NE that relays communication manages the state of the NE on the downstream side (on the side opposite to the management apparatus) on behalf of the NMS apparatus, whereby it is possible to reduce the traffic amount in the state synchronization. Even when a communication system including a plurality of communication apparatuses and a management apparatus is used, it becomes possible for the management apparatus to manage the communication apparatus while preventing an increase in the load. Further, by using a communication method executed in the communication apparatus 1 and a program that executes the communication method as well, it becomes possible for the management apparatus to manage the communication apparatus while preventing an increase in the load.

First Example Embodiment

Hereinafter, with reference to the drawings, an example embodiment will be described. For the sake of clarification of the descriptions, the following description and the drawings are omitted and simplified as appropriate. Further, throughout the drawings, the same components are denoted by the same reference symbols and overlapping descriptions will be omitted as necessary.

Figure 2:
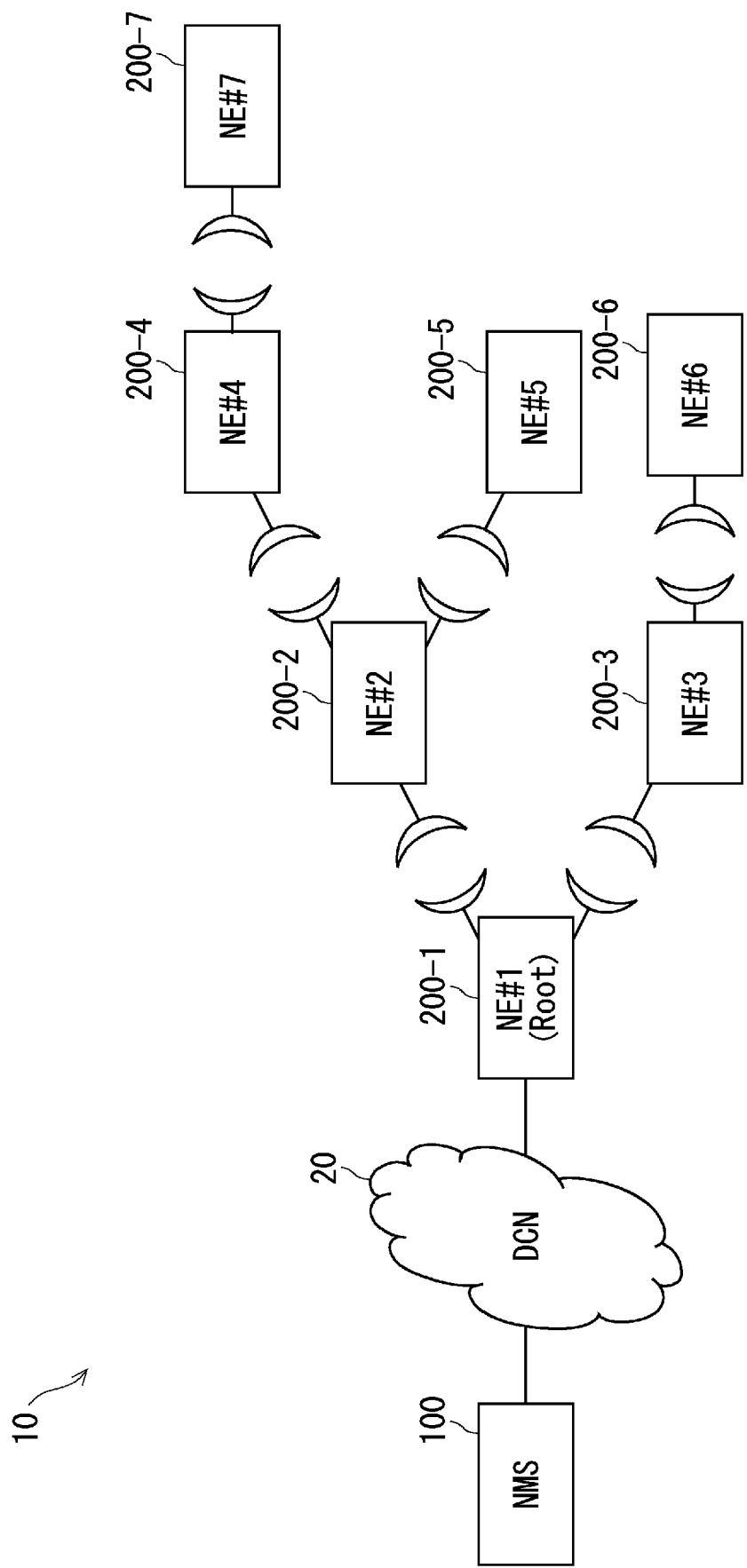
FIG. 2 is a diagram showing a communication system according to a first example embodiment.

FIG. 2 is a diagram showing a communication system 10 according to the first example embodiment. The communication system 10 includes an NMS apparatus 100 and a plurality of NEs 200-1 to 200-7. In the following, when a plurality of components such as the NEs 200-1 to 200-7 are used without distinction, they may be simply referred to as an NE 200 or the like. The NMS apparatus 100 corresponds to the aforementioned management apparatus. The NE 200 corresponds to the aforementioned communication apparatus 1.

The NE 200-1 is connected to the NE 200-2 and the NE 200-3 in such a way that they can communicate with each other wirelessly. The NE 200-2 is connected to the NE 200-4 and the NE 200-5 in such a way that they can communicate with each other wirelessly. The NE 200-3 is connected to the NE 200-6 in such a way that they can communicate with each other wirelessly. The NE 200-4 is connected to the NE 200-7 in such a way that they can communicate with each other wirelessly. Note that the details of the configuration of the NE 200 will be described later.

The NMS apparatus 100 includes a function of collecting and managing the states of the plurality of NEs 200. Further, the NMS apparatus 100 may include a function of displaying the state of the management on a screen. The NMS apparatus 100 may be connected to a specific NE 200-1 (Root NE) via a DCN 20 (Data Communication Network, monitoring control network). The NMS apparatus 100 is able to exchange control messages with each NE 200 via the NE 200-1 (Root NE). Note that the plurality of NEs 200 configure a tree topology in which the NE 200-1 (Root NE) is provided at the top. Therefore, each NE 200 is able to exchange control messages with the NMS apparatus 100 via the NE 200 provided on the upstream side (on the side of the NMS apparatus 100). For example, the NE 200-2 is able to exchange control messages with the NMS apparatus 100 via the NE 200-1. The details of the configuration of the NMS apparatus 100 will be described later.

Comparative Example

Figure 3:
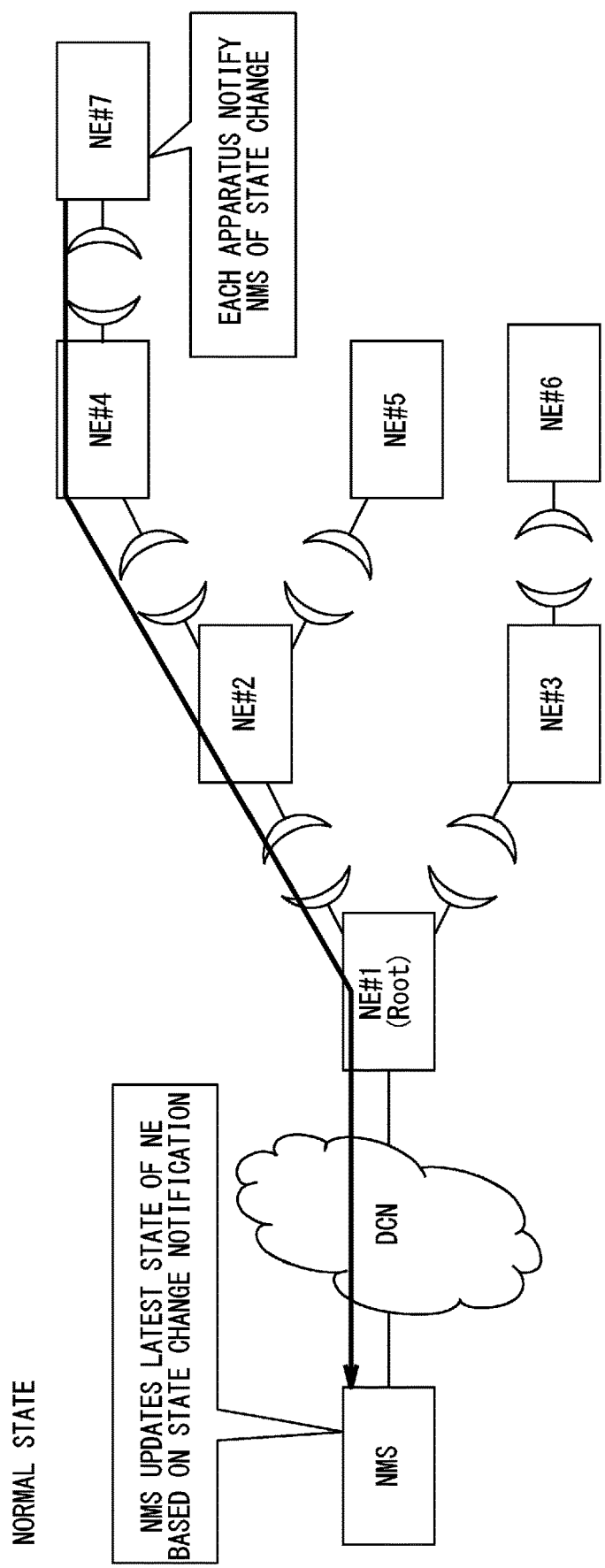
FIG. 3 is a diagram for describing a problem in a communication system according to a comparative example.
Figure 4:
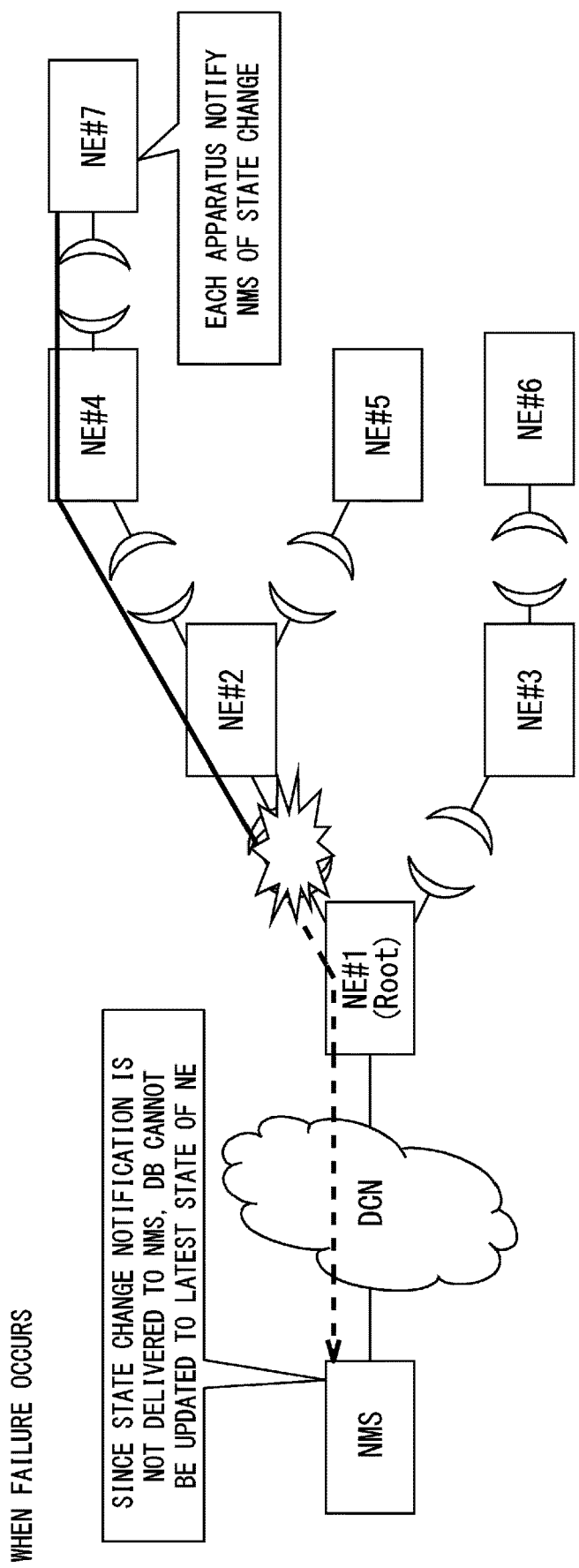
FIG. 4 is a diagram for describing a problem in the communication system according to the comparative example.
Figure 5:
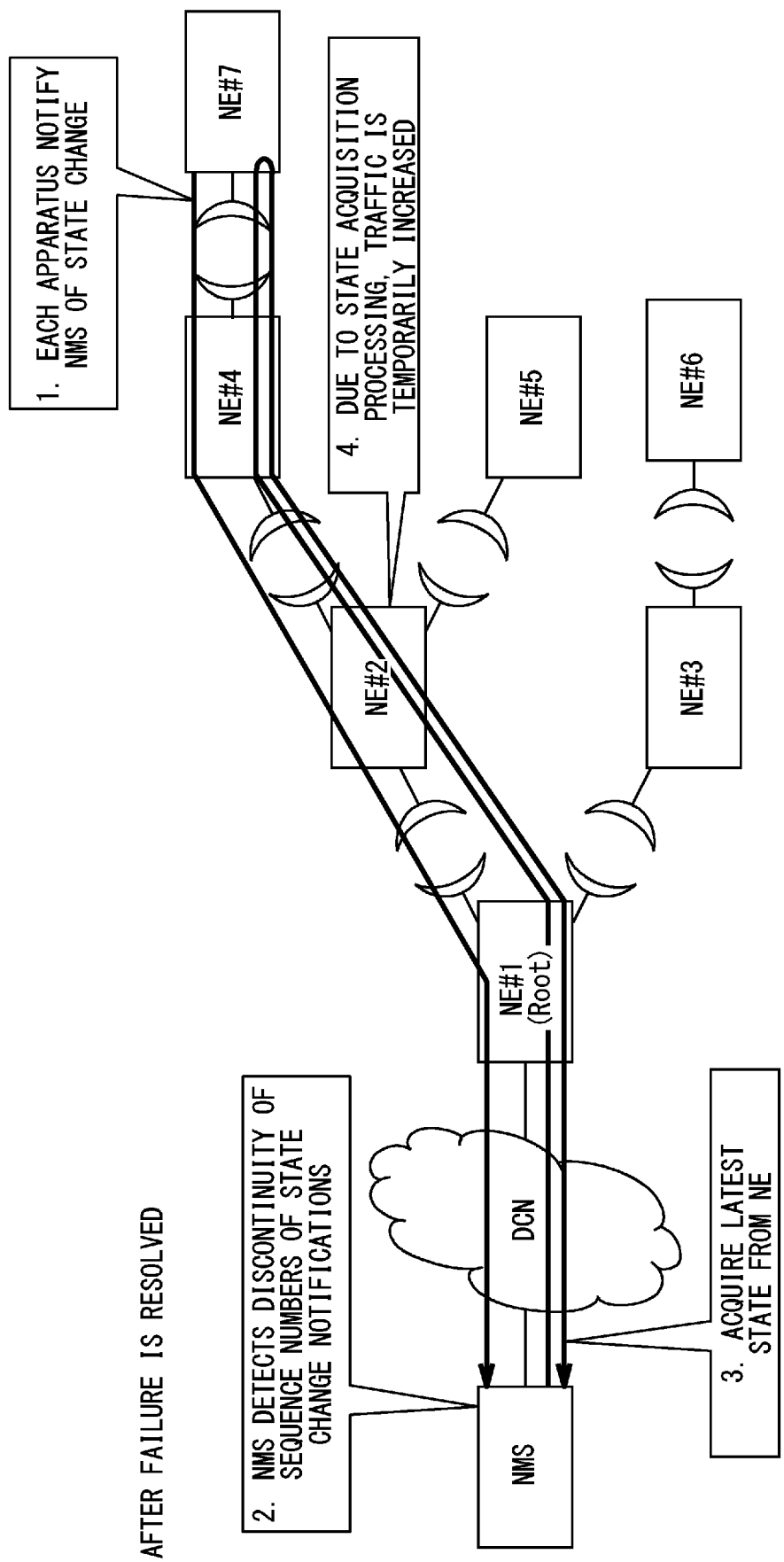
FIG. 5 is a diagram for describing a problem in the communication system according to the comparative example.

Prior to giving the description of the configuration of the NMS apparatus 100 and the NE 200 according to the first example embodiment, problems in a communication system according to a comparative example that does not include functions according to the present disclosure that will be described later will be described. FIGS. 3 to 5 are diagrams for describing problems in a communication system according to the comparative example.

When a communication failure has not occurred, that is, in the normal state, as shown in FIG. 3, each of the NEs transmits a state change notification (event notification) indicating a state change to the NMS apparatus. Then messages transmitted from the respective NEs are transmitted to the NMS apparatus via NEs and the DCN provided on the upstream side. The NMS apparatus updates the latest state of the NE that has transmitted the state change notification based on the state change notification. Here, sequence numbers are given to state change notifications (event notifications) from the respective NEs, and the NMS apparatus monitors these sequence numbers.

In a radio transmission network in a communication system, a communication interruption in a monitoring control network (DCN) for management may frequently occur due to, for example, the following factors.

The line quality fluctuates over time.

NEs are often installed in remote areas and electric outages frequently occur in a station building.

Problems regarding spatial adjustment of wireless transmission paths, such as antenna misalignment, are likely to occur.

When a communication failure like a communication interruption has occurred as shown in FIG. 4, in the radio transmission network, an event notification does not reach the NMS apparatus from the NE. Therefore, there is a period during which the NMS apparatus cannot monitor the NE state. When the NE state is changed in the period during which the NMS apparatus cannot monitor the NE state, a notification missing, which indicates a state in which an event notification does not reach the NMS apparatus although it has been transmitted to the NMS apparatus, occurs. Therefore, the NMS apparatus cannot update the state of the NE in the DB (database) to the latest state, which causes there to be a difference between the management state of the NMS apparatus and the actual state of the NE. At this time, the sequence number of the state change notification that has become a notification missing becomes a missing number in the NMS apparatus.

When the communication failure has been recovered and each NE transmits the state change notification (event notification) to the NMS apparatus as shown in FIG. 5 (Step #1), this state change notification reaches the NMS apparatus. Since the notification missing is occurring in the state in which a failure is occurring as described above, the NMS apparatus detects discontinuity of sequence numbers of the state change notifications (Step #2). Upon detecting the discontinuity of sequence numbers, the NMS apparatus acquires the latest state by communicating with the corresponding NE and performs recollection and synchronization of the NE state (Step #3). In this way, the difference between the management state of the NMS apparatus and the actual state of the NE may be resolved. However, due to the state acquisition processing for recollection and synchronization of the NE state, the traffic is temporarily increased (Step #4). Therefore, there is a problem that a large communication capacity of the DCN is consumed due to the increase in the traffic.

Assume, as one example, that inconsistencies between the states of 30 NEs that are provided in the downstream of the NMS apparatus and that in the NMS apparatus has occurred due to a communication failure (e.g., DCN failure). Since the NMS apparatus monitors tens of thousands of apparatuses and the wireless state changes from moment to moment in a large-scale radio transmission network, a single communication failure may cause inconsistencies between the states of a large number of NEs and that in the NMS apparatus. In this case, if it is assumed that 100 kB communication is required for one NE to recollect the state, the communication volume of 100 kB*30 NEs=3 MB is required after the communication failure has been recovered. If it is assumed that bandwidth of 2 Mbps is secured as bandwidth for the DCN, the DCN bandwidth is occupied for 3 MB*8 bit/2 Mbps=12 seconds for recollection of the state.

On the other hand, in the communication system 10 according to this example embodiment, the NE 200 where the communication failure has occurred in the upstream link of itself (in the example shown in FIG. 4, the NE 200-2) manages the state of a downstream NE 200 (in the example shown in FIG. 4, the NE 200-7) on behalf of the NMS apparatus 100. In the example shown in FIG. 4, the NE 200-2 where the communication failure has occurred in the upstream link of itself manages the state of the NE 200-7 on behalf of the NMS apparatus 100. Then after the upstream link is recovered, the NE 200 notifies the NMS apparatus 100 of only the state difference (i.e., state change) of the downstream NE 200. Accordingly, synchronization of the management state of the NMS apparatus 100 and the actual state of the NE 200 is secured. Further, it becomes unnecessary to perform state recollection processing, which may cause the bandwidth of the DCN to be narrowed.

Configuration of Apparatus According to this Example Embodiment

Figure 6:
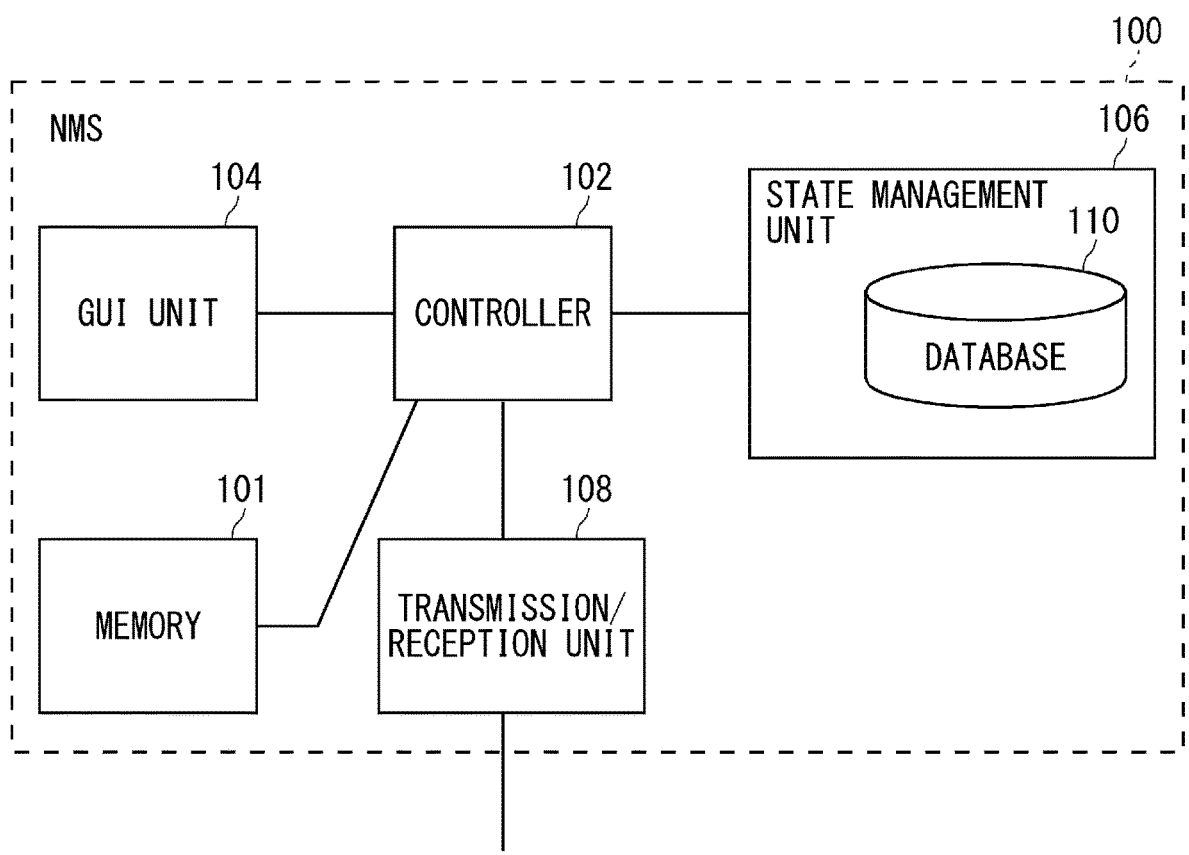
FIG. 6 is a diagram showing a configuration of an NMS apparatus according to the first example embodiment.

FIG. 6 is a diagram showing a configuration of the NMS apparatus 100 according to the first example embodiment. The NMS apparatus 100 includes a memory 101, a controller 102, a GUI unit 104, a state management unit 106, and a transmission/reception unit 108. The state management unit 106 includes a database 110 (DB). The memory 101 is, for example, a storage device such as a Random Access Memory (RAM) or a Read Only Memory (ROM). The controller 102 is, for example, a processor such as a Central Processing Unit (CPU). The controller 102 controls the overall processing of the NMS apparatus 100. Further, the controller 102 may realize each of the components of the NMS apparatus 100 by executing a program stored in the memory 101.

The GUI unit 104 (Graphical User Interface) displays the state managed by the NMS apparatus 100 on the screen. The GUI unit 104 may include a display device such as a display. The transmission/reception unit 108 is connected to the NE 200-1, which is a Root NE, via the DCN 20. The transmission/reception unit 108 performs processing that is necessary to communicate with each NE 200 via the DCN 20. The state management unit 106 manages the state of each of the NEs 200 using the database 110.

FIG. 7 is a diagram illustrating the content of the database 110 according to the first example embodiment. As illustrated in FIG. 7, the database 110 stores state information in which the ID of the NE 200, the ID of the module that forms the NE 200, and the current state of this module are associated with one another. The content of the database 110 may be updated by the aforementioned state change notifications.

Figure 8:
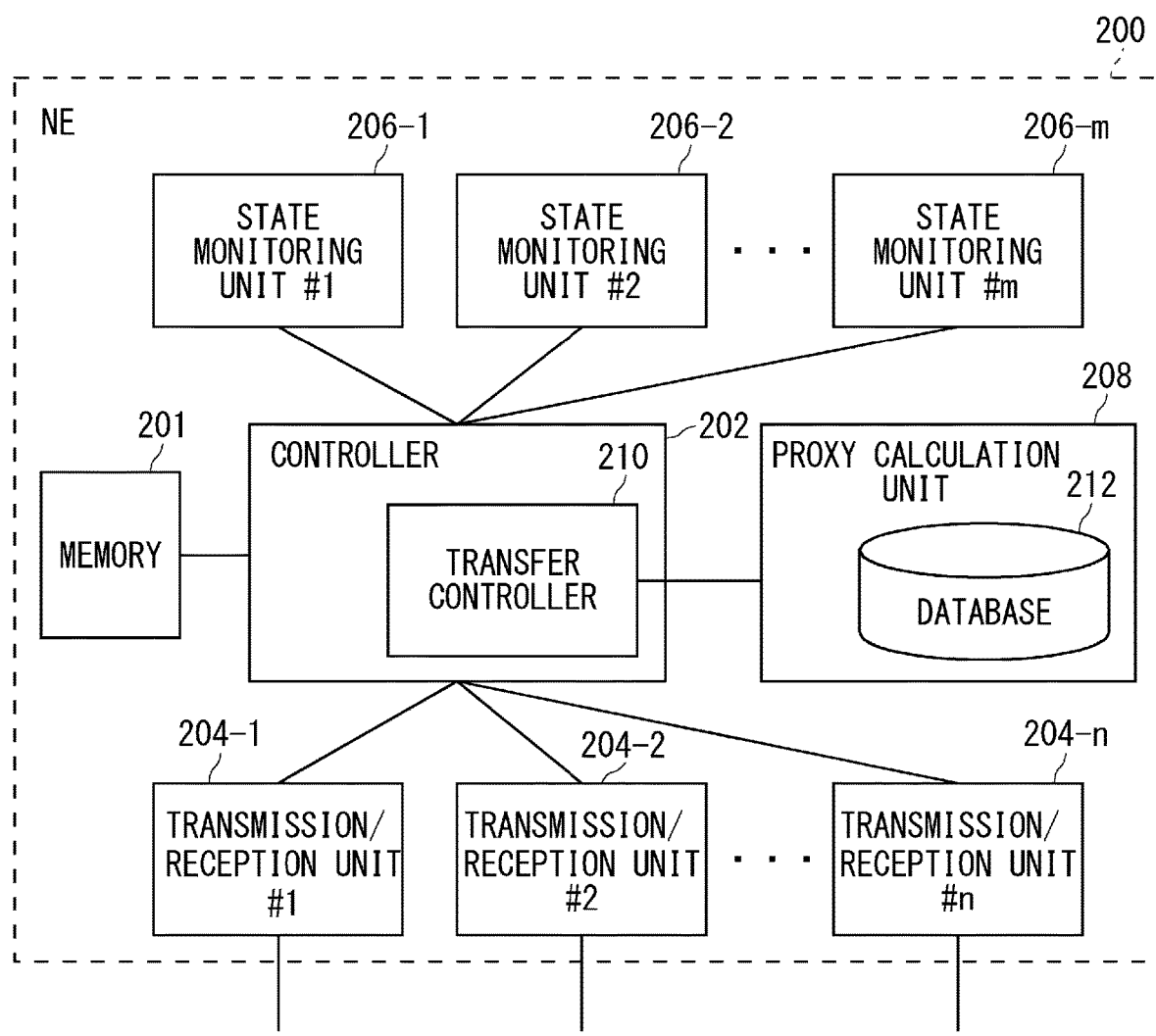
FIG. 8 is a diagram showing a configuration of an NE according to the first example embodiment.

FIG. 8 is a diagram showing a configuration of the NE 200 according to the first example embodiment. The NE 200 includes a memory 201, a controller 202, a plurality of transmission/reception units 204-1 to 204-$n$, a plurality of state monitoring units 206-1 to 206-$m$, and a proxy calculation unit 208. Note that n is an integer equal to two or greater and corresponds to the number of other NEs 200 (and the NMS apparatus 100) to which the NE 200 is connected. Further, m is an integer equal to two or greater and corresponds to the number of modules to be monitored in the NE 200. Further, the controller 202 includes a transfer controller 210. The proxy calculation unit 208 includes a database 212. Note that the transmission/reception unit 204 corresponds to the communication unit 2 shown in FIG. 1. The transfer controller 210 (i.e., transfer control unit) corresponds to the transfer control unit 4 shown in FIG. 1. The proxy calculation unit 208 corresponds to the proxy calculation unit 6 shown in FIG. 1.

The memory 201 is, for example, a storage device such as a RAM or a ROM. The controller 202 is, for example, a processor such as a CPU. The controller 202 controls the overall processing of the NE 200. Further, the controller 202 may achieve each of the components of the NE 200 by executing a program stored in the memory 201.

The transmission/reception units 204-1 to 204-$n$ are connected to the respective NEs 200 on the upstream side or the NEs 200 on the downstream side wirelessly, for example. Note that the NE 200-1 (Root NE) is connected to the NMS apparatus 100 via the DCN 20 instead of being directly connected to the NEs 200 on the upstream side. For example, the transmission/reception units 204-1, 204-2, and 204-3 of the NE 200-2 may be respectively connected to the NEs 200-1, 200-4, and 200-5. The transmission/reception unit 204 performs processing that is necessary to communicate with other connected NEs 200 (or the NMS apparatus 100) wirelessly, for example.

The state monitoring units 206-1 to 206-$m$ are provided for each module (e.g., a network interface, a CPU, and a signal transfer circuit) of the NE 200. The state monitoring unit 206 monitors the state of each module. When the state of a module is changed, the state monitoring unit 206 performs processing for transmitting the state change notification to the NMS apparatus 100 via the transmission/reception unit 204 (upstream interface) connected to the NE 200 on the upstream side. For example, when the state of the CPU has changed, the state monitoring unit 206-1 that monitors the CPU of the NE 200-2 performs processing for transmitting the state change notification to the NMS apparatus 100 via the transmission/reception unit 204-1 connected to the NE 200-1. Accordingly, the state change notification may be transmitted to the NMS apparatus 100 via the NE 200-1 and the DCN 20.

Further, upon receiving a state acquisition request from the NMS apparatus 100 via the transmission/reception unit 204 and the controller 202, the state monitoring unit 206 sends, as a response, the state of the module that it monitors. Accordingly, the state of the module may be transmitted to the NMS apparatus 100 in response to the state acquisition request.

The transfer controller 210 transfers the control message (state change notification etc.) received from an NE 200 on the downstream side to an NE 200 on the upstream side. Specifically, upon receiving the control message for the NMS apparatus 100, the transmission/reception unit 204 (downstream interface) connected to the NE 200 on the downstream side transmits this control message to the transfer controller 210. The transfer controller 210 transfers this control message to the transmission/reception unit 204 (upstream interface) connected to the NE 200 provided on the upstream side. When a communication failure occurs on the upstream side, the transfer controller 210 transfers this control message to the proxy calculation unit. Further, when the upstream interface receives a message for an NE 200 other than itself, the transfer controller 210 transfers this message to a downstream interface which is provided on the side of the destination NE 200.

The proxy calculation unit 208 performs, when a communication failure is occurring on the upstream side, state calculation performed by the NMS apparatus 100 on behalf of the NMS apparatus, that is, proxy calculation. The state calculation here is calculation that the state management unit 106 of the NMS apparatus 100 performs to manage the state of an NE 200. In the state calculation, for example, it is calculated how the state of which module of which NE 200 has been changed. The proxy calculation unit 208 manages the state of an NE 200 on the downstream side using the database 212. The database 212 stores data that is similar to the one illustrated in FIG. 7. In other words, the database 212 holds data that corresponds to data managed by the NMS apparatus 100. That is, the database 212 stores, as a result of the proxy calculation, state information in which the ID of the NE 200, the ID of the module that forms the NE 200, and the state of the module are associated with one another.

(Operations)

Figure 9:
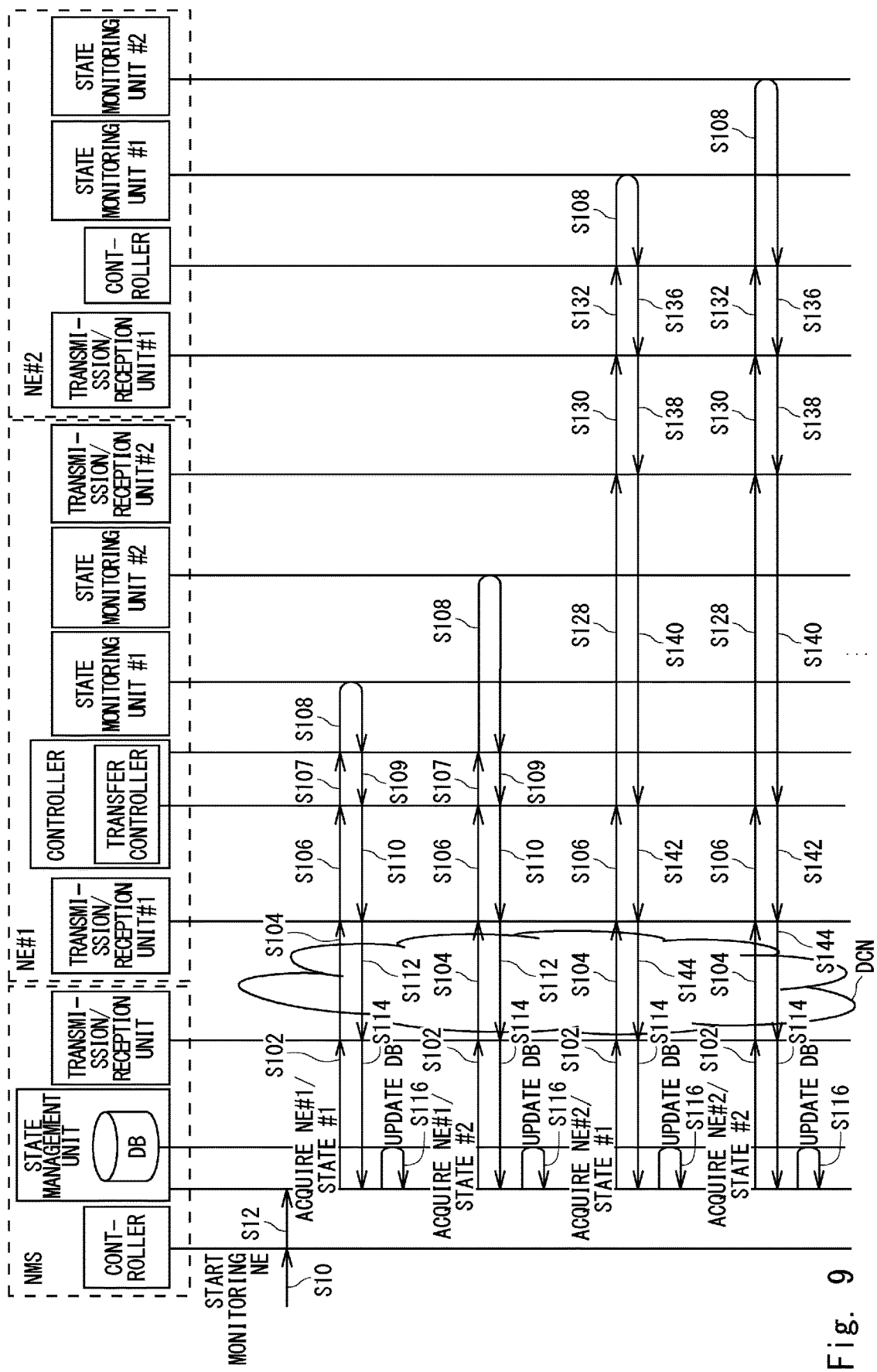
FIG. 9 is a sequence diagram showing a flow of communication executed by the communication system according to the first example embodiment.
Figure 10:
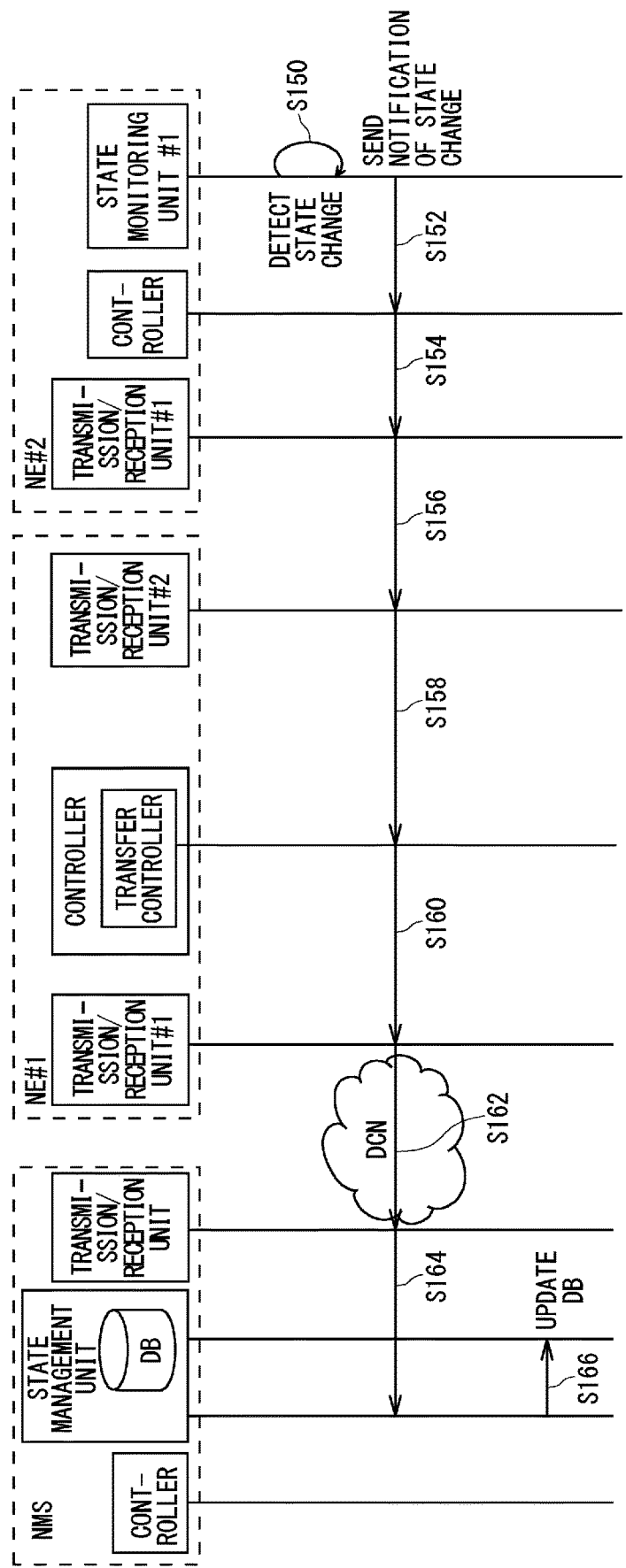
FIG. 10 is a sequence diagram showing a flow of communication executed by the communication system according to the first example embodiment.
Figure 11:
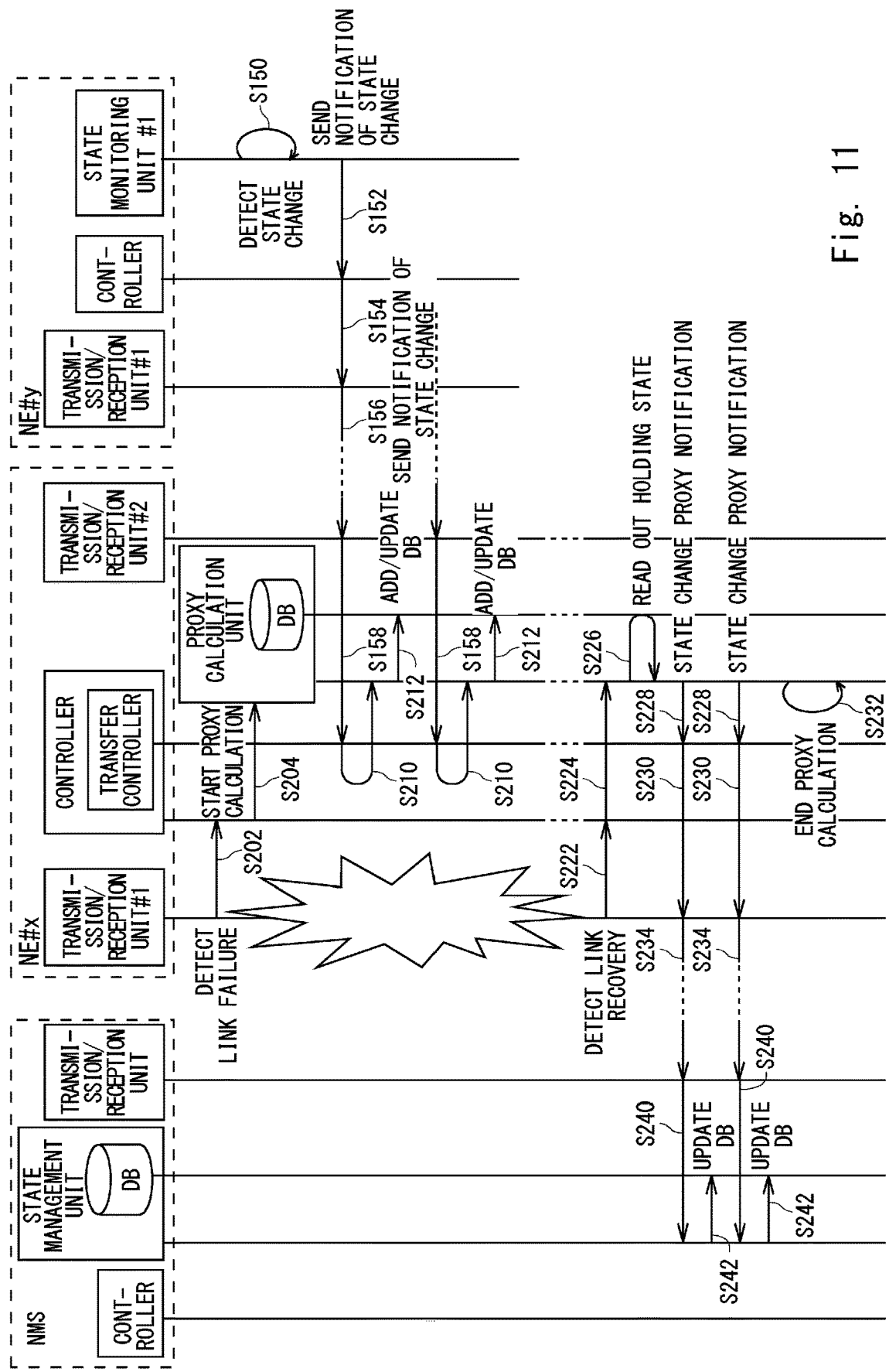
FIG. 11 is a sequence diagram showing a flow of communication executed by the communication system according to the first example embodiment.

FIGS. 9 to 11 are sequence diagrams showing a flow of communication executed by the communication system 10 according to the first example embodiment. FIG. 9 shows a monitoring start sequence of the NE 200. Upon accepting an instruction to start monitoring the NE 200 from a user or the like (Step S10), the controller 102 of the NMS apparatus 100 transmits this instruction to the state management unit 106 (Step S12). Accordingly, the state management unit 106 starts monitoring the state of the NE 200.

Upon starting monitoring of the NE 200, the state management unit 106 transmits a state acquisition request regarding states of all the modules of all the NEs 200 to be monitored via the transmission/reception unit 108. Specifically, the state management unit 106 transmits the state acquisition request to the transmission/reception unit 108 (Step S102). The transmission/reception unit 108 transmits the state acquisition request to the transmission/reception unit 204-1 of the NE 200-1 (Root NE) via the DCN 20 (Step S104).

The state acquisition request is transferred by the transmission/reception unit 204 and the transfer controller 210 of the NE 200-1 (Root NE) and an NE 200 provided in the upstream of the target NE 200 and transferred to the controller 202 of the target NE 200. Specifically, in the NE 200-1, the transmission/reception unit 204-1 on the upstream side transmits the state acquisition request to the transfer controller 210 of the controller 202 (Step S106). When the target of the state acquisition request is the NE 200-1, the transfer controller 210 notifies the controller 202 of itself of the state acquisition request (Step S107). On the other hand, when the target of the state acquisition request is another NE (in this example, the NE 200-2), the transfer controller 210 transmits the state acquisition request to the transmission/reception unit 204-2 on the downstream side (Step S128). The transmission/reception unit 204-2 transmits the state acquisition request to the upstream transmission/reception unit 204-1 of the downstream NE 200 (in this example, the NE 200-2) (Step S130). The transmission/reception unit 204-1 transmits the state acquisition request to the controller 202 (Step S132).

Upon receiving the state acquisition request, the controller 202 of the target NE 200 reads out the state of the module from the state monitoring unit 206 that monitors the state of the target module on the target NE 200 (Step S108). When, for example, the state acquisition request indicates "NE #1/state #1", the controller 202 of the NE 200-1 reads out the state of the module #1 from the state monitoring unit 206-1. Further, when the state acquisition request indicates "NE #2/state #2", the controller 202 of the NE 200-2 reads out the state of the module #2 from the state monitoring unit 206-2.

Then the controller 202 sends, as a response, the state of the module and the corresponding module ID to the NMS apparatus. This response is transferred to the NMS apparatus 100 by the transmission/reception unit 204 and the transfer controller 210 of an NE 200 on the upstream side and the NE 200-1 (Root NE). Specifically, when the target of the state acquisition request is the NE 200-1, the controller 202 notifies, in the NE 200-1, the transfer controller 210 of the module state (Step S109). The transfer controller 210 transmits the module state to the transmission/reception unit 204-1 on the upstream side (Step S110). The transmission/reception unit 204-1 on the upstream side transmits the module state to the transmission/reception unit 108 of the NMS apparatus 100 via the DCN 20 (Step S112).

When the target of the state acquisition request is the NE 200-2, the controller 202 transmits, in the NE 200-2, the module state to the transmission/reception unit 204-1 on the upstream side (Step S136). The transmission/reception unit 204-1 on the upstream side transmits the module state to the downstream transmission/reception unit 204-2 of the upstream NE 200 (in this example, the NE 200-1) (Step S138). In the NE 200-1, the transmission/reception unit 204-2 on the downstream side transmits the module state to the transfer controller 210 (Step S140). The transfer controller 210 transmits the module state to the transmission/reception unit 204-1 on the upstream side (Step S142). The transmission/reception unit 204-1 on the upstream side transmits the module state to the transmission/reception unit 108 of the NMS apparatus 100 via the DCN 20 (Step S144).

The NMS apparatus 100 that has received the response writes the ID of the NE 200, the module ID included in the response, and its state into the database 110. Specifically, the transmission/reception unit 108 transmits the received response (module state) to the state management unit 106 (Step S114). The state management unit 106 updates the information in the database 110 using the module state (Step S116).

FIG. 10 shows a notification sequence of the state change in a normal state (when there is no communication failure). When the state of a module in the NE 200 (in this example, the NE 200-2) is changed, the state monitoring unit 206 that corresponds to this module detects the state change (Step S150). The state monitoring unit 206 transmits a state change notification indicating the module ID and the new state for the NMS apparatus 100 via the transmission/reception unit 204-1 connected to an NE 200 on the upstream side (in this example, the NE 200-1). Specifically, in the NE 200-2, the state monitoring unit 206 transmits the state change notification to the controller 202 (Step S152). The controller 202 transmits the state change notification to the transmission/reception unit 204-1 on the upstream side (Step S154). The transmission/reception unit 204-1 transmits the state change notification to the downstream transmission/reception unit 204-2 of the upstream NE 200 (Step S156). In the NE 200-1, the transmission/reception unit 204-2 on the downstream side transmits the state change notification to the transfer controller 210 (Step S158).

Upon receiving the state change notification, the transfer controller 210 of the NE 200 on the upstream side determines whether or not the communication link of the transmission/reception unit 204-1 connected to the NE 200 (or the NMS apparatus 100) provided in the upstream of itself is valid (that is, whether or not a communication failure is occurring). The determination regarding whether or not this link is valid may be executed, for example, by using hardware such as a detection circuit provided in the transmission/reception unit 204 or the transfer controller 210 or software.

In the example shown in FIG. 10, the transfer controller 210 determines that the link is valid, that is, a communication failure is not occurring in the link on the upstream side. In this case, the transfer controller 210 transfers the state change notification to the transmission/reception unit 204-1 connected to the NE 200 (or the NMS apparatus 100) on the upstream side (Step S160). By repeating the processing in S156 to S160 for each of the NEs 200 provided before the NMS apparatus 100, the state change notification is transferred to the NMS apparatus 100. The transmission/reception unit 204-1 on the side of the NMS apparatus 100 of the NE 200-1, which is the Root NE, transmits the state change notification to the transmission/reception unit 108 of the NMS apparatus 100 via the DCN 20 (Step S162). The transmission/reception unit 108 transmits the received state change notification to the state management unit 106 (Step S164). The state management unit 106 updates the information in the database 110 by the ID of the NE 200, the module ID, and the state included in the state change notification (Step S166).

FIG. 11 shows a notification sequence of the state change when a communication failure has occurred. When the controller 202 of the NE 200-$x$ (NE #x) detects a link failure in the transmission/reception unit 204-1 connected to the NE 200 (or the NMS apparatus 100) on the upstream side, the proxy calculation processing is started by the proxy calculation unit 208. Specifically, the transmission/reception unit 204-1 detects that the communication link on the upstream side has become invalid and transmits a notification indicating that the upstream side has become a link failure to the controller 202 (Step S202). Upon receiving this notification, the controller 202 outputs an instruction to start proxy calculation to the proxy calculation unit 208 (Step S204). Accordingly, the proxy calculation processing in the proxy calculation unit 208 is started.

When the transfer controller 210 of the NE 200 that is executing the proxy calculation processing has received the state change notification from the NE 200-$y$ (NE #y) in the process of transferring the state change notification, this state change notification is transferred to the proxy calculation unit 208. Note that the processing in which the state change notification is transmitted from the NE 200 is substantially similar to that shown in the example of FIG. 10. That is, when a state change occurs in the module of the NE 200 (NE 200-$y$ (NE #y)), the state monitoring unit 206 that corresponds to this module detects a state change (S150). The state monitoring unit 206 transmits the state change notification for the NMS apparatus 100 via the transmission/reception unit 204-1 connected to the NE 200 on the upstream side (S152). The controller 202 transmits the state change notification to the transmission/reception unit 204-1 (S154). The transmission/reception unit 204-1 transmits the state change notification to the downstream transmission/reception unit 204-2 of the upstream NE 200 (S156). In the NE 200-$x$ (NE #x) on the upstream side, when the transmission/reception unit 204-2 on the downstream side receives the state change notification transmitted from the NE 200-$y$, the transmission/reception unit 204-2 on the downstream side transmits the received state change notification to the transfer controller 210 (S158). Since the communication failure is occurring, upon receiving the state change notification from the NE 200-$y$ (NE #y), the transfer controller 210 transfers this state change notification to the proxy calculation unit 208 (Step S210).

The proxy calculation unit 208 performs the proxy calculation on the transferred state change notification. Then the proxy calculation unit 208 stores, in the database 212, the ID of the NE 200 which has transmitted the state change notification and the state of the module ID that are indicated in the state change notification (Step S212). At this time, when an entry (corresponding to each row in the table shown in FIG. 7) of the corresponding module of the corresponding NE 200 is already present in the database 212, the proxy calculation unit 208 may update this entry. On the other hand, when there is no entry of the corresponding module of the corresponding NE 200 in the database 212, the proxy calculation unit 208 newly adds an entry. According to this processing, the database 212 may hold the latest state without holding the history of state changes.

When the controller 202 of the NE 200-$x$ has detected that a link with the transmission/reception unit 204-1 connected to the NE 200 (or the NMS apparatus 100) on the upstream side is valid, the stored state information is read out via the proxy calculation unit 208. Specifically, the transmission/reception unit 204-1 detects that the communication link on the upstream side has become valid and transmits a notification indicating that the link on the upstream side has been recovered to the controller 202 (Step S222). The controller 202 outputs the notification indicating that the link on the upstream side has been recovered to the proxy calculation unit 208 (Step S224). The proxy calculation unit 208 reads out the state of the NE 200 on the downstream side held in the database 212 (Step S226) and outputs the state that has been read out to the transfer controller 210 (Step S228). The transfer controller 210 outputs the state change proxy notification, which is a state change notification for sending a notification of the state change regarding the NE 200 on the downstream side in the period in which the communication failure has occurred, to the transmission/reception unit 204-1 (Step S230). At this time, the transfer controller 210 notifies the NMS apparatus 100 of all the entries held in the database 212 as a state change notification from the NE 200 that has the above state. Since the database 212 holds only the latest state of each NE 200, as described above, the transfer controller 210 transmits only the latest state of each NE 200 for the NMS apparatus 100 via the transmission/reception unit 204-1. After that, the proxy calculation unit 208 ends the proxy calculation (Step S232).

The transmission/reception unit 204-1 which is on the side of the NMS apparatus 100 of the NE 200-1 transmits the state change proxy notification to the transmission/reception unit 108 of the NMS apparatus 100 via the DCN 20 (Step S234). The transmission/reception unit 108 transmits the received state change proxy notification to the state management unit 106 (Step S240). The state management unit 106 updates the information in the database 110 by the ID of the NE 200, the module ID, and the state included in the state change proxy notification (Step S242).

(Effects)

As described above, in the first example embodiment, when a communication failure has occurred on the upstream side of an NE 200, the proxy calculation unit 208 is configured to accumulate the state change notifications about NEs 200 on the downstream side. When the communication failure has been recovered, the transfer controller 210 is configured to transmit the result of the calculation by the proxy calculation unit 208 to the NMS apparatus 100 via the transmission/reception unit 204 (communication unit). Accordingly, it is possible to prevent occurrence of a deviation between the state managed by the NMS apparatus 100 and the actual state of the NE 200. Further, by preventing occurrence of a deviation in the above manner, it becomes unnecessary for the NMS apparatus 100 to monitor the sequence numbers of the state change notifications and perform recollection and synchronization processing of the NE state when discontinuity of sequence numbers is detected. Accordingly, an increase in the traffic in the DCN 20 is prevented. Therefore, by the method according to the first example embodiment, when a failure in communication has occurred, it is possible to enable the NMS apparatus 100 (management apparatus) to manage the NE 200 (communication apparatus) while preventing an increase in the load.

Further, when the entry that corresponds to the state change notification is already present in the database 212, the proxy calculation unit 208 according to the first example embodiment updates the entry. When the failure in communication has been resolved, the transfer controller 210 transmits the entry held in the database 212 to the NMS apparatus 100 via the transmission/reception unit 204-1. Accordingly, in the first example embodiment, when a communication failure has occurred, the proxy calculation unit 208 is configured to calculate the latest state for each module of each NE 200 and the transfer controller 210 is configured to notify the NMS apparatus 100 of only the latest state after the failure is resolved. That is, the NE 200 (communication apparatus) according to the first example embodiment is configured to notify the NMS apparatus 100 of only the latest state of the module whose state has been changed while a communication failure is occurring. Accordingly, it is possible to reduce the notification traffic regarding state changes while a failure is occurring.

Assume, as one example, that, while a communication failure is occurring in a communication link provided in the upstream of one NE 200 (in the example shown in FIG. 11, NE #x), the states of two module per NE 200 have been changed in 30 NEs 200 provided in the downstream of the above NE 200. At this time, if 400 B communication is required in order to send a notification of one state change, the total volume of state change notifications becomes 400 B*2*30 NE=24 kB. This communication volume is such a volume that notifications can be sent without occupying the bandwidth for the DCN.

In the comparative example described with reference to FIGS. 3 to 5, state recollection needs to be performed. In this state recollection, states of all the modules, including modules whose states are not changed, need to be acquired, whereby a relatively large volume of communication, like 100 kB per NE, is required in order to perform the state recollection. On the other hand, according to this example embodiment, it is sufficient that only a state change notification regarding the module whose state has been changed be transmitted, which means that the communication volume for sending a notification of one state change (400B) is much smaller than the communication volume required for the state recollection (100 kB). Therefore, as described above, it is possible to reduce the notification traffic regarding a state change while a failure is occurring.

Further, the proxy calculation unit 208 according to the first example embodiment is configured to start proxy calculation when a failure in communication has occurred and end the proxy calculation when the failure in communication has been resolved and the result of the calculation is transmitted to the NMS apparatus 100. Accordingly, the proxy calculation unit 208 executes processing only when needed, whereby it is possible to prevent an increase in the load in the NE 200.

Modified Examples

Note that the present disclosure is not limited to the above example embodiment and may be changed as appropriate without departing from the spirit of the present disclosure. For example, while the communication system 10 according to the aforementioned example embodiment is a radio transmission network to which each NE 200 is connected in such a way that they can communicate with each other wirelessly, this configuration is merely one example. This example embodiment can be applied in order to solve problems related to a communication error of a state change notification when a communication failure occurs in a general network other than the radio transmission network.

Further, in the above-described sequence diagrams, the order of each process (step) may be changed as appropriate. Further, one or more of a plurality of processes (steps) may be omitted. Further, in S228, S230, S234, S240, and S242 in FIG. 11, the state change proxy notification (state change notification) is separately transmitted for each module and the NMS apparatus 100 separately updates the database 110 for each module. However, the NE 200 may collectively transmit the state change notification regarding a plurality of modules.

In the above-described examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiment disclosed above can be described as, but not limited to, the following supplementary notes.

(Supplementary Note 1)

A communication apparatus comprising:
communication means for communicating with a management apparatus that manages states of a plurality of communication apparatuses in a network including the plurality of communication apparatuses directly or via another communication apparatus;
transfer control means for performing control for performing processing of transferring a state change notification that has been transmitted from a first communication apparatus, which is another communication apparatus located on a side opposite to the management apparatus, and indicates a state change in the first communication apparatus; and
proxy calculation means for performing calculation for the state management performed by the management apparatus using the state change notification when a failure in communication has occurred at the side of the management apparatus, wherein,
when the failure in communication has occurred, the transfer control means outputs the state change notification to the proxy calculation means, and
when the failure in communication has been resolved, the transfer control means performs control so as to transmit the result of the calculation by the proxy calculation means to the management apparatus.

(Supplementary Note 2)

The communication apparatus according to Supplementary Note 1, wherein
the transfer control means performs control so as to transfer the state change notification transmitted from the first communication apparatus to the management apparatus when the failure in communication has not occurred, and the transfer control means outputs the state change notification to the proxy calculation means without performing control to transfer the state change notification to the management apparatus when the failure in communication has occurred.

(Supplementary Note 3)

The communication apparatus according to Supplementary Note 1 or 2, wherein the proxy calculation means includes a database that holds data corresponding to data managed by the management apparatus.

(Supplementary Note 4)

The communication apparatus according to Supplementary Note 3, wherein, when an entry that corresponds to the received state change notification is already present in the database, the proxy calculation means updates the entry.

(Supplementary Note 5)

The communication apparatus according to Supplementary Note 4, wherein, when the failure in communication has been resolved, the transfer control means performs control so as to transmit the entry held in the database to the management apparatus.

(Supplementary Note 6)

The communication apparatus according to any one of Supplementary Notes 1 to 5, wherein the proxy calculation means starts the calculation when a failure in communication has occurred and ends the calculation when the failure in communication has been resolved and the result of the calculation is transmitted to the management apparatus.

(Supplementary Note 7)

A communication system comprising:
  a plurality of communication apparatuses that form a network; and
  a management apparatus that is connected to at least one of the plurality of communication apparatuses and manages states of the plurality of communication apparatuses, wherein
  the communication apparatus comprises:
    communication means for communicating with the management apparatus directly or via another communication apparatus;
    transfer control means for performing control for processing of transferring a state change notification that has been transmitted from a first communication apparatus, which is another communication apparatus located on a side opposite to the management apparatus, and indicates a state change in the first communication apparatus; and
    proxy calculation means for performing calculation for the state management performed by the management apparatus using the state change notification when a failure in communication has occurred at the side of the management apparatus,
  when the failure in communication has occurred, the transfer control means outputs the state change notification to the proxy calculation means, and
  when the failure in communication has been resolved, the transfer control means performs control so as to transmit the result of the calculation by the proxy calculation means to the management apparatus.

(Supplementary Note 8)

The communication system according to Supplementary Note 7, wherein
  the transfer control means performs control so as to transfer the state change notification transmitted from the first communication apparatus to the management apparatus when the failure in communication has not occurred, and the transfer control means outputs the state change notification to the proxy calculation means without performing control to transfer the state change notification to the management apparatus when the failure in communication has occurred.

(Supplementary Note 9)

The communication system according to Supplementary Note 7 or 8, wherein the proxy calculation means includes a database that holds data corresponding to data managed by the management apparatus.

(Supplementary Note 10)

The communication system according to Supplementary Note 9, wherein, when an entry that corresponds to the received state change notification is already present in the database, the proxy calculation means updates the entry.

(Supplementary Note 11)

The communication system according to Supplementary Note 10, wherein, when the failure in communication has been resolved, the transfer control means performs control so as to transmit the entry held in the database to the management apparatus.

(Supplementary Note 12)

The communication system according to any one of Supplementary Notes 7 to 11, wherein the proxy calculation means starts the calculation when a failure in communication has occurred and ends the calculation when the failure in communication has been resolved and the result of the calculation is transmitted to the management apparatus.

(Supplementary Note 13)

A communication method comprising:
  communicating with a management apparatus that manages states of a plurality of communication apparatuses in a network including the plurality of communication apparatuses directly or via another communication apparatus;
  performing, when a failure in communication has occurred at the side of the management apparatus, calculation for the state management performed by the management apparatus using a state change notification that has been transmitted from a first communication apparatus, which is another communication apparatus located on a side opposite to the management apparatus, and indicates a state change in the first communication apparatus; and
  performing control to transmit the result of the calculation to the management apparatus when the failure in communication has been resolved.

(Supplementary Note 14)

The communication method according to Supplementary Note 13, comprising:
  performing control so as to transfer the state change notification transmitted from the first communication apparatus to the management apparatus when the failure in communication has not occurred; and
  performing, when the failure in communication has occurred, calculation for the state management performed by the management apparatus using the state change notification without performing control to transfer the state change notification to the management apparatus.

(Supplementary Note 15)

The communication method according to Supplementary Note 13 or 14, comprising providing a database that holds data corresponding to data managed by the management apparatus.

(Supplementary Note 16)

The communication method according to Supplementary Note 15, comprising updating an entry when the entry that corresponds to the received state change notification is already present in the database.

(Supplementary Note 17)

The communication method according to Supplementary Note 16, comprising performing control so as to transmit an entry held in the database to the management apparatus when the failure in communication has been resolved.

(Supplementary Note 18)

A non-transitory computer readable medium storing a program for causing a computer to execute the following steps of:

performing, when a failure in communication has occurred at the side of a management apparatus that manages states of a plurality of communication apparatuses in a network including the plurality of communication apparatuses, calculation for the state management performed by the management apparatus using a state change notification that has been transmitted from a first communication apparatus, which is another communication apparatus located on a side opposite to the management apparatus, and indicates a state change in the first communication apparatus; and performing control so as to transmit the result of the calculation to the management apparatus when the failure in communication has been resolved.

While the present disclosure has been described with reference to the example embodiment, the present disclosure is not limited to the above example embodiment. Various changes that may be understood by those skilled in the art may be made to the configurations and the details of the present application.

This application is based upon and claims the benefit of priority from Japanese Patent Application No. 2019-054307, filed on Mar. 22, 2019, the disclosure of which is incorporated herein in its entirety by reference.

REFERENCE SIGNS LIST

1 Communication Apparatus
2 Communication Unit
4 Transfer Control Unit
6 Proxy Calculation Unit
10 Communication System
100 NMS Apparatus
102 Controller
104 GUI Unit
106 State Management Unit
108 Transmission/reception Unit
110 Database
200 NE
202 Controller
204 Transmission/reception Unit
206 State Monitoring Unit
208 Proxy Calculation Unit
210 Transfer Controller
212 Database

What is claimed is:

1. A communication apparatus comprising:
hardware, including a processor and memory storing instructions executable by the processor to:
communicate with a management apparatus that manages states of a plurality of communication apparatuses of a network directly or via another communication apparatus;
when a failure in communication has not occurred at a side of the management apparatus, transfer to the management apparatus a state change notification transmitted from a first communication apparatus located on the side of the management apparatus, and indicate a state change in the first communication apparatus, by relaying communication between the management apparatus and the first communication apparatus, wherein the state change notification is transferred to the management apparatus so that the management apparatus performs a calculation for state management using the state change notification, such that the communication apparatus does not perform the calculation when the failure has occurred;
when the failure in communication has occurred, perform the calculation for the state management that would ordinarily and otherwise performed by the management apparatus but that cannot be performed by the management apparatus due to the state change notification not being transferred to the management apparatus, using the state change notification, and output the state change notification without transferring the state change notification to the management apparatus;
when the failure in communication has occurred and once the failure has been resolved, transmit a result of the calculation to the management apparatus.

2. The communication apparatus according to claim 1, further comprising a database that holds data corresponding to data managed by the management apparatus.

3. The communication apparatus according to claim 2, wherein the instructions are executable by the processor to further, when an entry that corresponds to the received state change notification is present in the database, update the entry.

4. The communication apparatus according to claim 3, wherein, when the failure in communication has been resolved, the entry held in the database is transmitted to the management apparatus.

5. The communication apparatus according to claim 1, wherein the calculation is started when the failure in communication occurs and the calculation is ended when the failure in communication has been resolved and the result of the calculation is transmitted to the management apparatus.

6. A communication system comprising:
a plurality of communication apparatuses that form a network; and
a management apparatus that is connected to at least one of the plurality of communication apparatuses and manages states of the plurality of communication apparatuses, wherein
the communication apparatus comprises:
hardware, including a processor and memory storing instructions executable by the processor to:
communicate with a management apparatus that manages states of a plurality of communication apparatuses of a network directly or via another communication apparatus;
when a failure in communication has not occurred at a side of the management apparatus, transfer to the management apparatus a state change notification transmitted from a first communication apparatus located on the side of the management apparatus, and indicate a state change in the first communication apparatus, by relaying communication between the management apparatus and the first communication apparatus, wherein the state change notification is transferred to the management apparatus so that the management apparatus performs a calculation for state management using the state change notification, such that the communication apparatus does not perform the calculation when the failure has occurred;

when the failure in communication has occurred, perform the calculation for the state management that would ordinarily and otherwise performed by the management apparatus but that cannot be performed by the management apparatus due to the state change notification not being transferred to the management apparatus, using the state change notification, and output the state change notification without transferring the state change notification to the management apparatus;

when the failure in communication has occurred and once the failure has been resolved, transmit a result of the calculation to the management apparatus.

7. The communication system according to claim 6, further comprising a database that holds data corresponding to data managed by the management apparatus.

8. The communication system according to claim 7, wherein the instructions are executable by the processor to further, when an entry that corresponds to the received state change notification is present in the database, update the entry.

9. The communication system according to claim 8, when the failure in communication has been resolved, the entry held in the database is transmitted to the management apparatus.

10. The communication system according to claim 6, wherein the calculation is started when the failure in communication occurs and the calculation is ended when the failure in communication has been resolved and the result of the calculation is transmitted to the management apparatus.

11. A communication method that is performed by a communication apparatus, the communication method comprising:

communicating with a management apparatus that manages states of a plurality of communication apparatuses of a network directly or via another communication apparatus;

when a failure in communication has not occurred at a side of the management apparatus, transferring to the management apparatus a state change notification transmitted from a first communication apparatus located on the side of the management apparatus, and indicating a state change in the first communication apparatus, by relaying communication between the management apparatus and the first communication apparatus, wherein the state change notification is transferred to the management apparatus so that the management apparatus performs a calculation for state management using the state change notification, such that the communication apparatus does not perform the calculation when the failure has occurred;

when the failure in communication has occurred, performing the calculation for state management that is ordinarily and otherwise performed by the management apparatus but that cannot be performed by the management apparatus due to the state change notification not being transferred to the management apparatus, using the state change notification, and outputting the state change notification without transferring the state change notification to the management apparatus;

when the failure in communication has occurred and once the failure has been resolved, transmitting a result of the calculation to the management apparatus when the failure in communication.

12. The communication method according to claim 11, further comprising providing a database that holds data corresponding to data managed by the management apparatus.

13. The communication method according to claim 12, further comprising, when an entry that corresponds to the received state change notification is present in the database, updating the entry.

14. The communication method according to claim 13, comprising, when the failure in communication has been resolved, transmitting the entry held in the database to the management apparatus.

15. A non-transitory computer readable medium storing a program for causing a computer to execute:

communicating with a management apparatus that manages states of a plurality of communication apparatuses of a network directly or via another communication apparatus;

when a failure in communication has not occurred at a side of the management apparatus, transferring a state change notification transmitted from a first communication apparatus located on the side of the management apparatus, and indicating a state change in the first communication apparatus, by relaying communication between the management apparatus and the first communication apparatus;

when the failure in communication has occurred, performing a calculation for state management performed by the management apparatus using the state change notification, and outputting the state change notification without transferring the state change notification to the management apparatus;

when the failure in communication has occurred and once the failure has been resolved, transmitting a result of the calculation to the management apparatus when the failure in communication.

* * * * *